United States Patent [19]
Swearingen

[11] 3,895,689
[45] July 22, 1975

[54] THRUST BEARING LUBRICANT MEASUREMENT AND BALANCE

[76] Inventor: Judson S. Swearingen, 500 Bel Air Rd., Los Angeles, Calif. 90024

[22] Filed: Sept. 7, 1973

[21] Appl. No.: 395,246

Related U.S. Application Data

[63] Continuation-in-part of Ser. No. 1,130, Jan. 7, 1970, abandoned, and a continuation-in-part of Ser. No. 210,705, Dec. 22, 1971, Pat. No. 3,828,610.

[52] U.S. Cl. ............... 184/6.4; 415/104; 184/6.16; 308/9
[51] Int. Cl. ............................................. F01m 1/18
[58] Field of Search ............ 184/6 R, 6.4, 1 E, 6.16; 415/104, 105, 106, 112, 131; 308/9, DIG. 1; 73/140, 141 R; 277/3, 15

[56] References Cited
UNITED STATES PATENTS

| | | | |
|---|---|---|---|
| 1,296,180 | 3/1919 | Graemiger | 415/106 |
| 1,936,066 | 11/1933 | Peterson | 415/104 |
| 3,146,037 | 8/1964 | Hooker | 308/9 |
| 3,223,463 | 12/1965 | Porath | 308/9 |
| 3,258,199 | 6/1966 | Anderson | 308/9 |
| 3,506,375 | 4/1970 | Endress | 415/105 |
| 3,531,223 | 9/1970 | Daltry | 415/105 |

Primary Examiner—Richard C. Pinkham
Assistant Examiner—Marvin Siskind
Attorney, Agent, or Firm—Browning & Bushman

[57] ABSTRACT

A method of determining the axial thrust on a thrust bearing assembly having a fixed and a rotating component in which a lubricant is being forced between the mated faces of the respective components and where zones of pressure are built up during operation, comprising monitoring the pressure of the lubricant between the mated faces. The invention also provides for determining the axial thrust by measuring the pressure differential of the lubricant between the mated faces or as it enters therebetween and as it emerges from between said faces. To measure the axial thrust on a pair of opposing thrust bearing assemblies, the pressure differential of the lubricant between the respective mated faces of the two assemblies is obtained. The axial thrust measurement can be utilized in a method of adjusting the axial thrust on the bearing assemblies by changing manually or automatically a balancing apparatus separate from the thrust bearings and their lubricant and used to adjust the net thrust on the bearings in response to the respective pressure measurement. The invention also encompasses the combination of suitable pressure measuring devices with thrust bearing assemblies with balancing apparatus to carry out the above measurement and control methods.

13 Claims, 10 Drawing Figures

Fig. 1

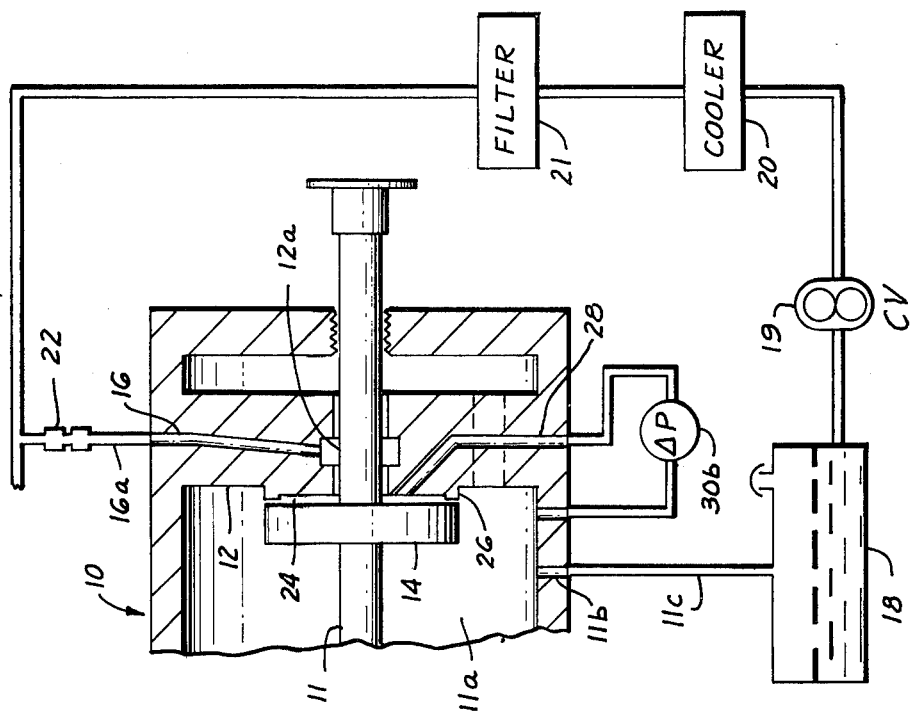
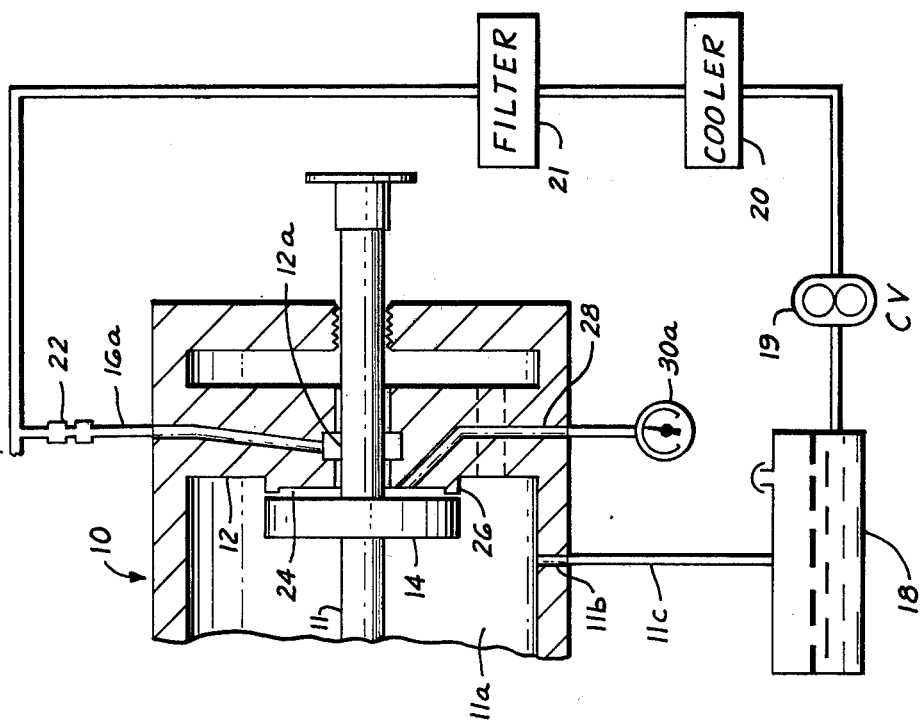

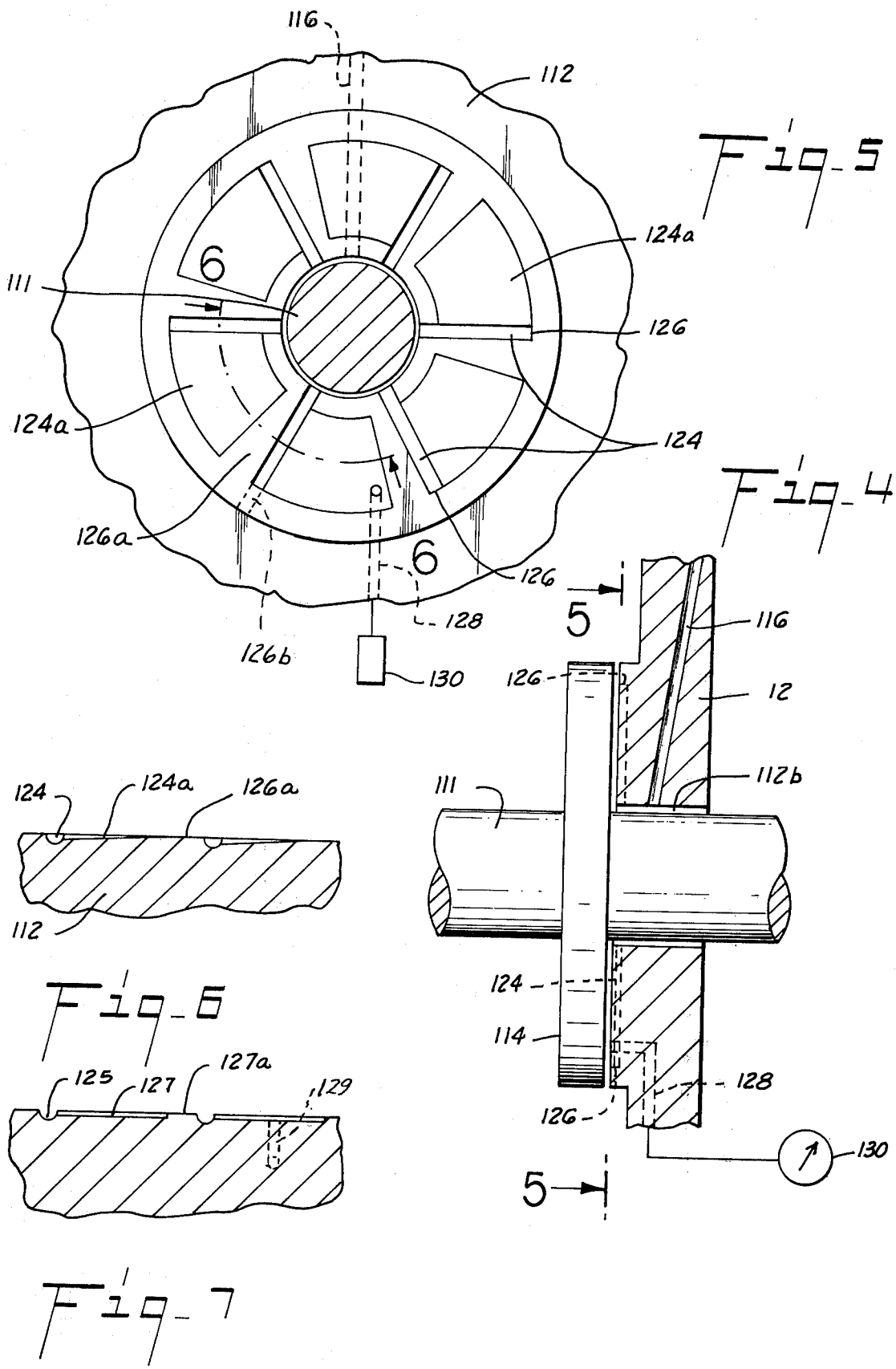

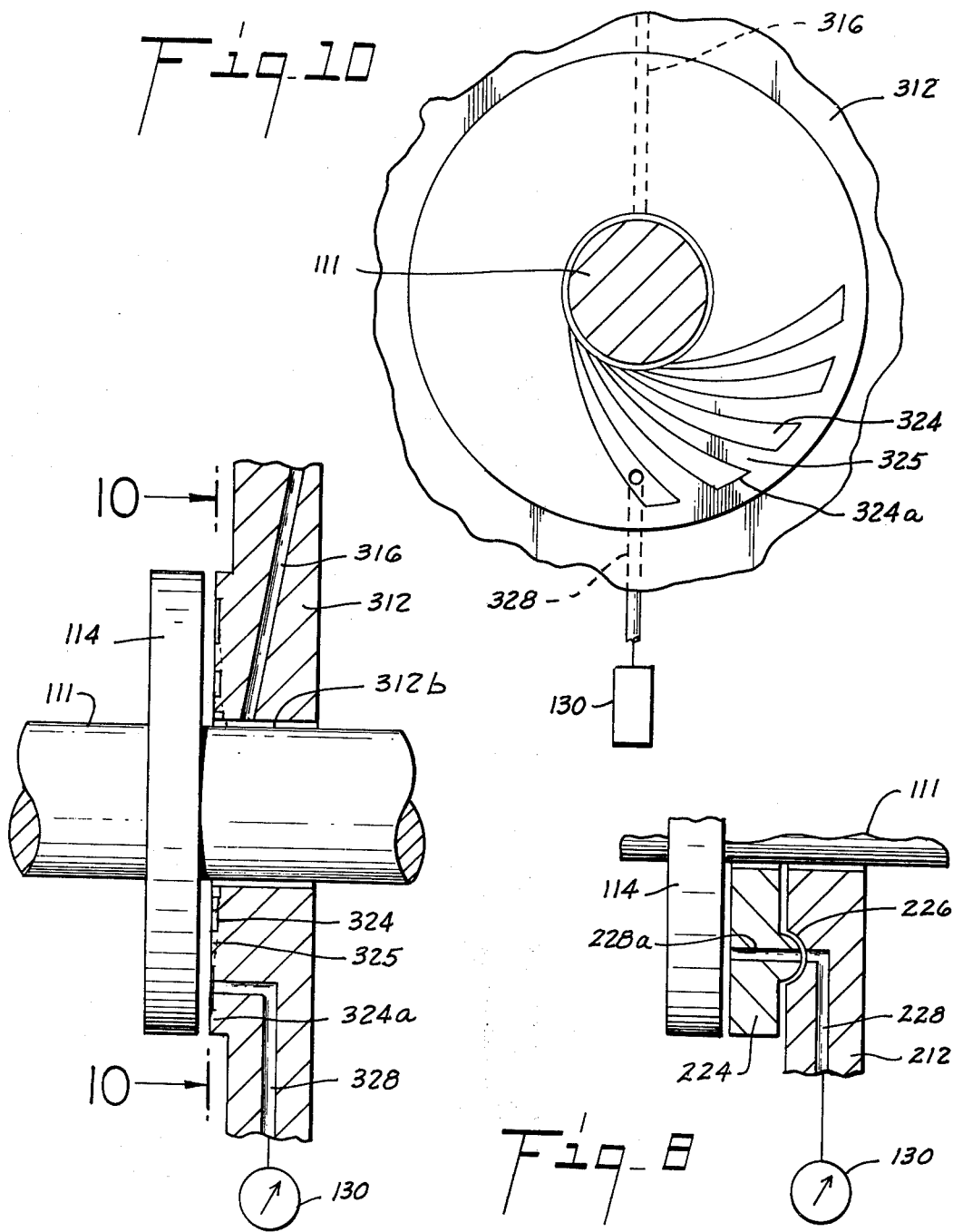

THRUST BEARING LUBRICANT MEASUREMENT AND BALANCE

BACKGROUND OF THE INVENTION

This application is a continuation in part of my earlier copending application, Ser. No. 1,130 filed Jan. 7, 1970 and now abandoned, and also of my copending application, Ser. No. 210,705 filed Dec. 22, 1971 and now U.S. Pat. No. 3,828,610.

The present invention relates to rotating machinery which may be subject to axial thrust loading. More particularly the invention relates to the measurement and control of axial thrust on thrust bearing assemblies.

In high speed rotating machinery such as centrifugal pumps, compressors, turbines, turboexpanders and the like, many of the maintenance problems originate in the thrust bearings primarily due to the fact that the thrust on the shaft is subject to wide variations due to many factors, among which are pressure or load variations on the machinery, poor seal design, etc. Unlike journal bearings which are circumferential, thrust bearings are radial and should the lubrication fail momentarily, centrifugal force acts to sling out the residual lubricating oil and quickly permits metal-to-metal contact of the bearing faces. Furthermore, thrust bearings have much higher rubbing speeds than the associated journal bearings. In many pieces of rotating machinery such as those mentioned above, in order to minimize thrust bearing failure problems, the thrust on the shaft is calculated and than a balancing means provided which acts to supposedly neutralize the calculated thrust or at least bring it within a small selected range. For example, in multistage machines such as turbine compressors, turboexpanders, and the like so called "balancing drums" are used. Unfortunately, unless the thrust load is known, the balancing means is of minimal value. In any event, since thrust load is not easily estimated in many cases or may change very rapidly from its supposed "known" value, the use of a balancing means may not always prove to be satisfactory. Heretofore, no easy or accurate methods of measuring thrust load have been available which would permit maximum utilization of a balancing means.

SUMMARY OF THE INVENTION

It is therefore an object of the present invention to provide a method for determining the axial thrust on a thrust bearing assembly.

Another object of the present invention is to provide a method for measuring the axial thrust on a pair of opposing thrust bearings used to maintain axial position of a shaft.

Yet another object of the present invention is to provide a method for controlling the axial thrust on a thrust bearing assembly.

Still another object of the present invention is to provide a method for controlling the axial thrust on a pair of opposing thrust bearings used to maintain axial location of a shaft.

Another object of the present invention is to provide a suitable measuring device in combination with a bearing assembly for measuring the axial thrust on the bearing assembly.

A further object of the present invention is to provide a system whereby the axial thrust on bearing assemblies may be controlled automatically.

These and other objects of the present invention will become apparent from the figures, the description given herein and the appended claims.

In a typical thrust bearing assembly there is a rotating component attached to the shaft and a fixed component through which the shaft extends. Opposed faces, one on each of the components, are generally mated together to form the thrust bearing surface. Common practice calls for injecting a lubricant through the fixed component and then allowing it to flow radially outward away therefrom between the mated faces of such fixed and rotating components. One of the common designs of the mated bearing faces is such that a resistance to the radial flow of the lubricant between the mated faces exists and the axial thrust being exerted on the bearing can be determined by monitoring the pressure between the mated faces or the pressure gradient of the lubricant across the mated faces of the bearing assembly. The pressure gradient measurement can be made entirely between the mated faces or by sensing the difference between the pressure between the mated faces and a reference pressure external of the bearing or between the mated faces of another bearing.

In the case of opposing thrust bearings of this kind used to axially position a shaft, the determination of axial thrust can be accomplished by measuring the pressure differential of the lubricant existing between the respective mated faces of the bearing assemblies.

The axial thrust measurement can be made the basis of a method for controlling axial thrust by using the various pressure measurements as a basis for adjusting a balancing means or other such device used to control the net axial thrust on a thrust bearing.

In another aspect, the present invention contemplates the combination of a thrust bearing assembly with suitable pressure measuring devices connected so as to carry out the above-described pressure measurements and the further combination with a balancing device or other such means to control, either automatically or manually, the axial thrust on the thrust bearings.

There are other types of thrust bearings which may not have significant lubricant pressure drop between inlet and discharge points which depend upon such features for carrying load as "fixed tapered shoes," fixed step shoes (Raleigh bearing), spiral groove (Whipped) bearings, tilting shoe (Kingsbury) bearings, cone-seat bearings and the like. However, the load is supported in all cases by pressure buildup, and a conduit connecting one of these areas to a pressure-measuring means will respond to the support load and the present invention can thus apply to them as well.

BRIEF DESCRIPTION OF THE DRAWINGS

FIG. 1 is a view, partly in section, of one embodiment of the presenet invention, employing thrust bearings of the type having significant pressure drop between inlet and discharge points and illustrating the use of the pressure of lubricant within each of two opposed bearings as references for each other, together with the automatic control of thrust in accordance with variation in differential between pressure within a bearing and a reference pressure.

FIG. 2 is a fragmentary view similar to the right hand portion of FIG. 1 illustrating another embodiment of the present invention applied to the same type of bearing.

FIG. 3 is a view similar to FIG. 2 illustrating yet another embodiment of the present invention applied to the same type of bearing.

FIG. 4 is a fragmentary view similar to a portion of FIG. 2 showing the application of this invention to a "fixed shoe" bearing as above mentioned.

FIG. 5 is a fragmentary view showing the faces of the fixed shoes of the bearing of FIG. 4, taken along the line 5—5 of FIG. 4.

FIG. 6 is a fragmentary sectional view along the line 6—6 of FIG. 5 showing the circumferential profile of such shoes to be of the "fixed tapered" variety.

FIG. 7 is a view similar to FIG. 6 but showing what the circumferential profile of the "fixed step" or Raleigh bearing shoe would be.

FIG. 8 is a fragmentary view similar to a portion of FIG. 4 showing the application of this invention to a "tilting shoe" Kingsbury type bearing.

FIG. 9 is a view similar to FIG. 4 but showing the invention applied to a "sprial groove" Whippel bearing.

FIG. 10 is a view similar to FIG. 5 taken along the line 10—10 of FIG. 9

DESCRIPTION OF THE PREFERRED EMBODIMENTS

Figure 1:
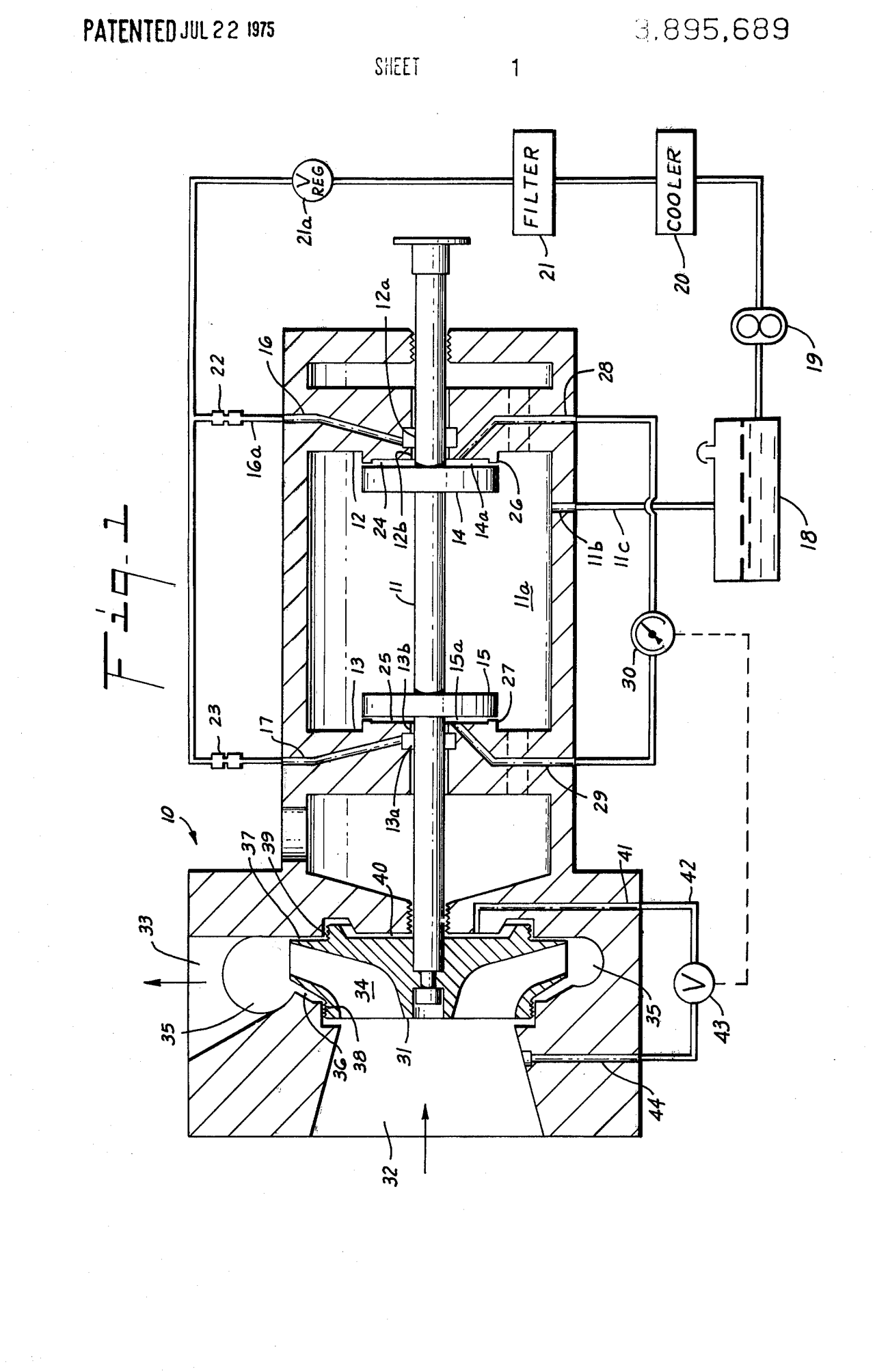

Referring now to FIG. 1, there is shown generally a centrifugal compressor 10. Compressor shaft 11 is rotatably mounted in journal bearings 12 and 13, one face 14a or 15a of each representing any of the various types of thrust bearings mentioned above and mated to a plane face of rotating disc-shaped thrust bearing members 14 and 15, respectively, which are fixedly mounted on shaft 11. The bearing assemblies comprising journal bearings 12 and 13 and thrust bearings 14 and 15 are lubricated through lubrication ports 16 and 17 which extend through journal bearings 12 and 13 and into the journal bearing spaces 12a and 13a between shaft 11 and journal bearings 12 and 13. Lubricating oil drawn from reservoir 18 is circulated via pump 19, cooler 20, filter 21, and pressure regulator 21a, then through flow limiting orifices 22 and 23 and then into lubrication ports 16 and 17. Lubricating oil forced into journal bearing spaces 12a and 13a will flow axially along shaft 11, a portion entering thrust bearing spaces 24 and 25 between the mated faces fo the bearing assemblies and flowing radially outward between said faces eventually escaping into bearing chamber 11a where it drains through drain tap 11b into conduit 11c and into reservoir 18. As previously stated, the rate of lubricant flow is limited by orifices 22 and 23. Usually section 12b and 13b of the respective bearings are of such clearance as to be restrictive and they will replace the said orifices. The mated bearing faces also contain restrictions 26 and 27 at their discharge edges to prevent massive loss of lubricating oil from the bearing assemblies. As shown, the restrictions consist of lips 26 and 27 which extend around the circumference of the thrust bearing faces of journal bearings 12 and 13. Referring to just one of the bearing assemblies, for clarity, it will be seen that since the lubricating oil is being forced into the assembly, any shifting of shaft 11 toward journal bearing 12 will increase the resistance to flow of lubricant between lip 26 and thrust bearing 14 and result in a buildup of pressure of lubricant in space 24. The pressure distribution is not necessarily uniform depending upon the tpe of bearing, but one versed in the art will know where the pressure buildup zone is so as to favorably locate pressure taps 28 and 29. The rise in pressure in space 24 will tend to urge thrust bearing 14 away from the thrust face of journal bearing 12 until the clearance between lip 26 and thrust bearing 14 is adjusted so as to control said pressure in 24 at a point where the thrust load is supported. Since as shown in FIG. 1, there are a pair of opposing thrust bearing assemblies to maintain the axial position of shaft 11, a like measurement as described for thrust bearing 14 can be made with respect to thrust bearing 15 through pressure tap 29. If the lubricant flow entering the respective bearing assemblies through orifices 22 and 23 is essentially the same, any axial shifting of shaft 11 will be evidenced by pressure changes in thrust bearing spaces 24 and 25. For example, if shaft 11 shifts toward journal bearings 12, the pressure in space 24 will increase relative to that in space 25. Consequently, the measurement of the pressure differential between thrust bearing space 24 and 25, which can be accomplished by differential pressure measuring device 30, connected to pressure taps 28 and 29 will give a direct indication of the axial thrust loading on shaft 11 reflected in the different axial thrust being carried by the opposing bearing assemblies.

It will be understood that even though the thrust bearing assemblies are opposed, i.e., directed so that one assembly takes the thrust of shaft movement in one direction and the other assembly takes the thrust of movement of the shaft in the other direction, such assemblies are usually constructed with sufficient clearance in the bearing spaces 24 and 25 that they do not work against each other. For example, if the shaft 11 moves to the right, the assembly including bearing 14 is loaded as described above so that it takes the thrust of this movement. At the same time, such movement to the right causes the bearing assembly including bearing 15 to be unloaded. Similarly, if the shaft moves to the left, bearing 15 is loaded and bearing 14 is unloaded. The pressure drop in the unloaded bearing is, for practical purposes, simultaneous with the initiation of movement of the shaft in the appropriate direction. Thus the unloaded bearing provides an excellent reference pressure for the loaded bearing. In many instances a reference pressure in the unloaded one of a pair of bearing assemblies is preferable to other available reference pressures. For example, since the reference pressure is located within the machine housing and is within a bearing which is under zero thrust load, the pressure differential corresponding to thrust of a given magnitude will accurately represent the pressure due to loading of the loaded bearing in excess of pressure representing zero load within a similar bearing.

To illustrate the present invention with reference to a single bearing assembly, reference is made to FIG. 2 wherein only a portion of the system set forth in FIG. 1 is shown. By connecting pressure measuring device 30a to pressure tap 28 and the monitoring the pressure of the lubricant in the space 24, it is possible to ascertain the axial thrust loading on the single bearing assembly since if the pressure over a period of time in space 24 decreases, it will be obvious that the thrust bearing 14 has shifted away from journal bearing 12 whereas if the pressure increases, it will be obvious that the thrust bearing 14 has shifted towards journal bearing 12. Obviously, an identical measurement can also be made on an opposing thrust bearing assembly and the two measurements compared if such is desired.

As explained above, when the resistance to flow of the lubricant from between the mated bearing faces is increased by shifting of the thrust bearing towards the thrust bearing face of the journal bearing, the pressure in the thrust bearing face begins to build up, such that there will be a gradient in pressure of the lubricant radially across the mated surfaces or at least a local pressure buildup. This pressure gradient or differential caused by axial shifting of shaft 11 can be measured as shown in FIG. 3 by connecting a differential pressure measuring means 30b between pressure tap 28 and a point downstream from between the mated faces of the bearing assembly such as to bearing chamber 11a which collects the lubricant escaping from the bearing. If the flow rate of this lubricant is maintained sufficiently high as it enters the bearing assembly through lubrication conduit 16, so as to lift the bearing 14 or 15 away from the facing surface of member 12 or 13, then in order to determine the pressure difference existing between the mated faces, it is only necessary to take the difference in the constant pressure reading and the pressure between the mated bearing faces as determined using the arrangement of FIG. 2.

The bearing design shown in FIGS. 1 and 2 is schematic as well as practical. In the schematic aspect it is intended to show the relationship of bearing load to the pressure in a pressurized zone in the bearing.

Many, if not most, thrust bearings generate pressurized areas within the thrust-carrying zone by hydrodynamic action. The lubricant is dragged by the rotating member into areas from which escape is restricted by the proximity of the mating thrust face. The total summation of incremental pressure areas built up in such zones is equal to the thrust load (within the bearing's load-carrying capability). The pressure distribution is substantially invariant with varying load except as to magnitude and therefore a pressure measurement in any such pressurized zone will give a good indication of the total thrust load.

Thus the configuration depicted in FIGS. 1 and 2, has a lubricant flow-limiting restriction as at 12a or 13b or 22 or 23 and a pressure containing restriction consisting of lip 26 and 27 to produce a thrust load indicating (and carrying) pressure zone between the mating thrust faces. A pressure containing restriction is also present in the designs shown in FIGS. 4 and 5, also in FIGS. 9 and 10.

In FIGS. 5 and 7 the lubricant is introduced into conduit grooves 124 and 125 which supply tapered areas 124a of FIG. 5 and fixed step grooves 127 of FIG. 7. These tapered and fixed step areas by the drag action of the moving mating face build up pressure toward their down-stream ends because of the restricted escape passages from there. However, it is not necessary to maintain special pressurization in grooves 124 and 125, only to provide a flooding supply of lubricant to the inlets to the tapered and the stepped zones. Thus, these grooves need not be closed as at 126, and may open as illustrated by the groove 126b, also as illustrated by FIG. 8 where the tilting shoes are flooded but not necessarily pressurized by the lubricant stream.

Returning now to FIG. 1, it is seen that compressor 10 comprises an impeller 31 mounted on shaft 11 and rotating therewith. The fluid to be compressed enters at compressor inlet 32 and is discharged at compressor outlet 33 after passing radially outward through passages 34 is impeller 31, the compressed fluid collecting in passage 35 before being discharged through outlet 33. A large part of pressure rise in the fluid being compressed in attained as the fluid passes through impeller passages 34 such that the pressuee of the fluid in passgae 35 is much greater than in inlet 32. The high pressusre existing in passage 35 is largely communicated into spacing 36 between the front face of impeller 31 and the body of compressor 10. This spacing is closed at its inside border by the presence of labyrinth seal 38. It leaks a small amount of the fluid from spacing 36 and returns it to suction via inlet 32. This small leakage, which is of the order of a few percent of the total flow, has negligible effect on the system.

Similarly, the high pressure in passage 35 is also largely communicated into space 37 between the backside of impeller 31 and compressor body 10. Likewise, labyrinth seal 39 prevents all but a negligible leakage of fluid into space 40, insofar as the performance of the compressor is concerned; nonetheless the small amount of leakage through labyrinth seal 39 via clearance 37 poses a significant problem because of the fact that once it enters space 40 between the backside of impeller 31 and the body of compressor 10, it becomes impressed over the area of the backside of impeller 31 within seal 39 and can result in significant thrust being exerted on impeller 31 away from shaft 11 because the area on the opposite side within seal 38 is not pressurized to offset it.

To overcome the above thrust problem, it is conventional, in high speed rotating machinery of the type described herein to provide some sort of balancing system whereby this thrust can be offset and thereby prevent serious damage to the bearings. One common thrust balancing arrangement is seen in FIG. 1. A passageway 41 leads from clearance 40 to conduit 42 thorugh valve 43 and then into passageway 44 which leads back to the suction of inlet 32 of compressor 10. In conventional systems employing this balancing system, valve 43 is absent and thus the fluid being compressed which is forced into clearance 40 is allowed to bleed back to the suction of inlet 32. Unfortunately, this balancing scheme presents certain complications inasmuch as the rate of leakage into, and consequently the pressure in, clearances 36 and 37 may vary depending on the roughness in those passages and depending on the leakage rate of seal 39. Moreover, there is a thrust due to the impact of the fluid entering the compressor itself and it is very possible that there are other thrust influences acting on the rotating system. Therefore, the mere drainage of the fluid out of clearance 40 and back into inlet 32 via passageway 41, conduit 42, and passageway 44 may not prove to be satisfactory as a method of balancing the axial thrust. The invention herein overcomes the problems associated with blindly attempting to balance the thrust. If the thrust is toward the shaft and away from the inlet of impeller 31, then it is obvious that the pressure in chamber 40 is lower than it should be or in other words, that the fluid is being allowed to bleed back too freely into inlet 32. In order to overcome this problem, I introduce valve 43, which can be closed slightly to restrict the flow of fluid out of chamber 40, thus maintaining the pressure in chamber 40 high enough to move impeller 31 in a direction away from shaft 12. Again, if the pressure in chamber 40 is lower than it should be with the result that shaft 11 is being forced to move away from impeller 31 by some unbalanced thrust, the pressure in space 24 will build up and become greater and the pressure in space 25 will fall. This change in the relative pressures of the two chambers will be immediately sensed by pressure differential device 30. By making pressure differential device 30 a differential pressure reader-controller, containing a means which will automatically adjust valve 43, it will be seen that the pressure in chamber 40 can be constantly maintained at some desired level regardless of changes in the thrust which may occur in the system. Thus, instead of a blind balancing of the thrust by allowing drainage of the fluid out of chamber 40, the present invention permits accurate control of the thrust forces acting on the rotating system.

One particularly simple and advantageous way of automatically adjusting valve 43 is by means of an actuating diaphragm, piston, or the like. Fluid from lines 28 and 29 can be directed to respective opposite sides of the diaphragm or piston. The difference in the pressures would cause automatic adjustment of the diaphragm or the like, and thus the valve 43, in accord with the thrust load. It will be appreciated that the pressures in lines 28 and 29 would in most cases be sufficient to operate such a diaphragm without amplification.

In the cases where the pressure gradient across the mated faces of a bearing assembly are being measured as depicted in FIG. 3, or if the change in pressure between the mated faces of a bearing assembly is being monitored as depicted in FIG. 2, the thrust on the rotating assembly can still be controlled by simply adjusting valve 43 in response to the reading of differential pressure measuring device 30b or pressure gauge 30a. This adjustment can be carried out manually or as was said for the arrangement depicted in FIG. 1, pressure devices 30a and 30b can have incorporated therein controller systems whereby valve 43 may be actuated automatically depending on the pressure reading. Suitable controller systems include any pneumatic, electrical or hydraulic servo system commonly employed in automatic control schemes as well as the actuating diaphragm type described above in connection with the embodiment of FIG. 1. Obviously, excessive thrust in either direction may be so controlled, although this may involve some adjustment in the radius of the seal 39.

As shown, the bearing assembly has a peripheral lip which restricts the flow of lubricant out of the assembly in proportion to the thrust load, the remaining portion of the bearing surfaces being substantially flat. In some bearing assemblies, it is common to have radial or spiral grooves in one of the two thrust faces as shown in FIGS. 4, 5, 6 and 7, and in FIGS. 9 and 10, respectively, or to have inclined surface sections milled into the other face as shown in FIG. 6, or these inclined surfaces may be pivoted as in a Kingsbury bearing as shown in FIG. 8, all of which have pressure build-up areas as hereinbefore described. The invention has equal application to such bearing systems provided the pressure connection communicates with a zone where there is a pressure buildup in the bearing in response to thrust loads.

More specifically, in FIG. 4, the rotating thrust bearing member 114 is shown facing an opposing stationary thrust bearing structure on the wall 112 which provides the journal bearing for the shaft 111. This wall has a lubrication port 116 extending into the journal bearing intermediate its ends. Lubricant entering this bearing flows in opposite directions along the shaft. That flowing to the left through space 112b enters the inner ends of radial grooves 124 in FIGS. 5 and 6 or 125 in FIG. 7. These may be terminated short of the outer periphery of the thrust bearing surface as shown at 126. Pressure and rate of flow of oil into the grooves 124 or 125 are not critical so long as they are kept full. On one side of each groove the face of member 112 is formed with a fixed flat surface sloping or tapered from deep to shallow in the direction in which the bearing 114 moves over it in rotation, as at 124a in FIG. 6, or of uniform depression as at 127 in FIG. 7. In either case these terminate short of the next groove 124 or 125 being separated from such next groove by a hand 126a in FIGS. 5 and 6 and 127a in FIG. 7.

Connecting to the space between one of the fixed tapered flat surfaces 124a and the bearing member 114 is a passageway 128 through the wall 112 having a pressure gauge 130 at its outer end for monitoring the pressure in said space at its opening near the land 126a. A similar passageway 129 is provided in the fixed step bearing of FIG. 7 for monitoring the pressure in the space overlying one of the surfaces 127.

The Kingsbury bearing shown in part in FIG. 8 is similar in construction to the fixed surface bearings of FIGS. 4, 5, and 6 and of FIG. 7. It is shown in corelation with the same shaft 111 and rotary thrust bearing member 114 fixed on the shaft as are the bearings in FIGS. 4, 5, 6 and 7. In this case, however, the lubricant will be supplied to the bearing face of the thrust bearing member 114 by suitable means such as permitting the member 114 to pass at least approximately its lower half through an oil bath as it rotates, or flooding the bearing shoes 224 with lubricant by other means. There are a number of such shoes circumferentially spaced from one another and corresponding roughly to the spaces between the grooves 124 and 125 in FIGS. 6 and 7, respectively. However, each shoe is pivotally separately mounted as at 226 on the stationary bearing wall 212. Essentially such shoe must be free to pivot on an axis approximately radial relative to the axis of shaft 111 but customarily it will be mounted for universal pivotal movement. In operation it will assume a position such that its surface facing the bearing member 114 will approximate the tilted or incline position of surface 124a of FIG. 6, as will be later more fully discussed.

For the purpose of monitoring the pressure between one of the shoes 224 and the bearing member 114, a passageway 228 is provided through the wall 212, with a pressure gauge 130 connected to its outer end. Its inner end is connected through one of the pivotal mountings 226 with a passageway 228a through the corresponding shoe 224 and opening through the face of that shoe which is opposed to bearing member 114.

Referring now to FIGS. 9 and 10, the bearing shown employs a shaft 111 and bearing member 114 which may be the same as those shown in FIGS. 4 through 8. Lubricant may be supplied by a passageway 316 through a stationary bearing support wall 312 opening at its inner end into a radial bearing 312b, from which part flows through such bearing along shaft 111 and into the thrust bearing space between the wall 312 and the bearing member 114. As in FIGS. 4 through 7, the thrust bearing face of wall 312 is recessed to provide circumferentially alternating grooves and lands, but the grooves 324 and lands 325 are of generally spiral configuration, the grooves being open toward the shaft 111 at their inner ends and closed at their outer ends 324a and of either uniform cross section or tapered from their open ends. The open ends may be exposed either inwardly or outwardly. Passageway 328 leads from the space within or adjacent one of the grooves 324, near its outer end, to a connection to a pressure gauge 130, by which the pressure between the bearing faces within one of the grooves may be monitored.

The bearings, per se, of FIGS. 4 through 10, all of which have been known long prior to this invention, differ in operation from those of FIGS. 1 – 3 in the way in which the oil pressure between the rotating and stationary faces of the thrust bearing is built up. All operate by providing a pressurized body of oil between such faces to transmit the thrust forces between them and all provide a pressure in such body which varies proportional to the total thrust so transmitted. The present invention monitors such total thrust by monitoring the pressures in the respective pressurized bodies of oil.

However, the pressure in FIGS. 1 – 3 is generated by the thrust force tending to close the outlet from such body of oil between the lip 26 or 27 and the adjacent facing surface of member 14 or 15 while oil continues to be fed into the body. Thus the pressure is actually varied in accordance with and proportional to endwise movement of the shaft and the maintenance of pressure indicative of the degree of thrust is dependent on maintenance of a rate and pressure of inflow sufficient to keep the lip 26 or 27 separated from member 14 or 15. It will operate whether or not there is rotation and may be said to be a "hydrostatic" type of bearing.

The forms shown in FIGS. 4 – 10 depend on rotation to provide the pressure of oil between the thrust bearing parts and may be termed "hydrodynamic" bearings. In FIGS. 4 – 6 rotation of the bearing member 114 across the grooves 124 sweeps oil from the grooves up and along the inclined or tapered surfaces 124a and builds it up thereon unitl the pressure therein is sufficient to begin to separate the lands 126a from the member 114 enough to let the oil begin to leak past such lands. At this point it will be evident that the oil pressure will be just sufficient to bear the total thrust and will indicate the value of such thrust. Monitoring of such pressure through an opening in the surface 124a near the land 126a will thus constitute an accurate monitoring of the thrust forces.

In the structure of FIG. 7 the action is similar, rotation building up pressure over the surfaces 127 until pressure of the oil is great enough to take the entire thrust force and separate the lands 127a from the member 114.

In the Kingsbury bearing of FIG. 8 the effect is also similar. However, when the oil is swept by member 114 onto the leading edge of the shoe, its pressure lifts the leading edge away from member 114 and forms a wedge-shaped body of oil with the leading edge thicker than the following, but with both edges spaced from member 114 by the body of oil. Monitoring this pressure through passageway 228 will serve to monitor the thrust taken by the bearing.

Finally, in the Whipple bearing of FIGS. 9 and 10, the rotation of member 114 serves to sweep oil along grooves 324 from a part (radially innermost) of larger cross section to a part of smaller cross section and build up pressure in the oil due to the drag of member 114 thereover until it is sufficient to begin to separate the lands 325 from the member 114, permitting the oil to spread over the lands and begin to leak out past the outer margins of the facing thrust bearing members. Monitoring the pressure anywhere within this pressurized area but preferably near the outer end of a groove 324 by the passageway 328 then serves to monitor the thrust force. It will be understood that in any of the forms illustrated in all the FIGS., either member could be the rotating member and the other the stationary member, that the grooves 324 may open in either radial direction, and that the pressure sensing tap may open to any portion of the body of oil whose pressure keeps the bearing faces separate.

Thus the monitoring and control of thrust according to this invention is applicable to the various hydrodynamic bearings as disclosed in the text of my original application, Ser. No. 1,130 as well as to the hydrostatic bearings disclosed therein.

It is to be noted that in the case of opposed bearings as illustrated in FIG. 1, in which there may be insufficient tolerance for endwise movement of the shaft to relieve the oil pressure in one of the bearings as that in the other bearing builds up under thrust, it is desirable to monitor the differential between the pressures in the two bearings as a true indicator of the thrust. However, if there is only one thrust bearing or the pressure on one is zero or negligible, it is unnecessary to monitor any bearing except that taking the thrust. The arrangement for monitoring the differential as shown is still desirable however because this not only provides a reference pressure for the bearing under stress, but also allows monitoring the pressure of either bearing which may be under stress.

Clearly, the monitoring means in any of the forms of bearings disclosed may be used to control a thrust controlling arrangement as shown in FIG. 1.

Whereas, I have said that the pressure in the bearing is a measure of the thrust force or load supported by the bearing, the relation between the measured pressure and the thrust is not necessarily linear; peculiarities of the bearing configuration and of fluid flow behavior in it may cause minor variations. However, it will be apparent that any pressuring measuring device used can be modified so as to compensate for such variations.

The methods and combinations described herein can be applied to any rotating machinery having appropoiate thrust bearing or like assemblies. More generally, however, the methods and combinations will be applied to high speed rotating machinery such as centrifugal pumps and compressors of both the single stage and multistage variety, turbines and turboexpanders also of the single stage and multistage variety.

I claim:

1. The method of controlling the axial thrust on a thrust bearing assembly of a rotating machine wherein said thrust bearing assembly comprises a rotating component and a non-rotating component, one face of said rotating component and one face of said non-rotating component being in opposing relationship with each other, wherein a lubricant is forced in operation between the opposed faces of said components forming a first zone of pressure between said faces maintaining them separated and transmitting thrust load between them; and wherein there is a balancing means operable to apply a desired end thrust to one of said components to adjust the thrust forces on said bearing; said method comprising the steps of determining from time to time the axial thrust on said assembly by monitoring the pressure of said lubricant in said first zone and operating said balancing means in accordance with the axial thrust determination to produce a desired aggregate thrust on said bearing assembly.

2. In a rotating machine having a thrust bearing assembly, said bearing assembly having a rotating component and a non-rotating component, one face of said non-rotating component and one face of said rotating component being in opposing relationship with each other, wherein a lubricant is forced in operation between the opposed faces of said components forming a first zone of pressure which is between said faces, and is pressurized to a thrust sustaining pressure to maintain said components separated, and a second pressure zone is created in said lubricant differing from said thrust sustaining pressure by an amount indicative of the thrust on said bearing assembly; the improvement which comprises a pressure determining means including a pressure sensing means exposed to said first zone, a pressure sensing means exposed to said second zone, and means for comparing the two, and a balancing means operable to adjust to a desired value, as indicated by said pressure determining means, the aggregate thrust force on said bearing assembly.

3. The combination of claim 2 wherein said balancing means is responsively connected to said pressure determining means and said pressure determining means contains means to automatically adjust said balancing means.

4. The combination of claim 2 wherein said rotating component of said machine is mounted on a shaft, wherein said machine further comprises a rotor mounted on said shaft distal said bearing assembly and designed to pass a working fluid therethrough and a fixed member between said rotor and said bearing assembly, wherein a portion of said working fluid is allowed to leak into a space between said rotor and said fixed member, and wherein said balancing means comprises means for controlling the pressure of the working fluid in said space.

5. A rotating machine according to claim 2 wherein said second zone is located downstream from between the mated faces.

6. The method of controlling the axial thrust on a thrust bearing assembly in a rotating machine in which machine said bearing assembly has a rotating component and a fixed component, one face of said fixed component and one face of said rotating component being in opposed mating relationship with one another, and in which machine a lubricant is forced into said assembly by the relative rotation of said components and them flows between the mated faces of said rotating and said fixed component, and the flow of lubricant between said mated faces generates zones of pressure, one of which is between said mated faces, sufficient to maintain said components separated, and the pressure of said zones differing from each other by an amount indicative of the value of the thrust load, said machine having in addition to a balancing means to adjust the thrust force on said bearing assembly; said method comprising the steps of monitoring the pressure of said lubricant in said one of said zones, monitoring the pressure of said lubricant in the other of said zones, determining the difference between the two pressures as an indication of the axial thrust on said assembly, and adjusting said balancing means in accordance with the axial thrust indication.

7. The method of claim 6 wherein said other of said zones is a zone of constant pressure of said lubricant.

8. In a rotating machine having a thrust bearing assembly having a rotating component and a fixed component, one face of said fixed component and one face of said rotating component being in mating relationship with one another, wherein a lubricant is forced into said assembly and then flows radially outward between the mated faces of said rotating and said fixed component, the flow of lubricant radially outward between said mated faces generating zones of pressure sufficient to maintain said components separated, and the difference in pressure of said zones being indicative of the value of the thrust load; the improvement which comprises the combination therewith of a pressure measuring means connected so as to monitor the pressure gradient of said lubricant across said mated faces between successive ones of such zones, at least one of which is between said mated faces and a balancing means to adjust the thrust force on said bearing assembly.

9. The combination of claim 8 wherein said balancing means is responsively connected to said pressure measuring means to automatically adjust said balancing means.

10. In a rotating machine having a pair of opposing thrust bearing assemblies to maintain axial location of a shaft of said machine, each of said bearing assemblies having a rotating component mounted on said shaft and a non-rotating component, one face of said rotating component and one face of said non-rotating component being in opposing relationship with each other, wherein a bearing lubricant body is created in operation between the opposed faces of said components and maintained under pressure sufficient to keep said components separated and transmit any thrust forces between them, the combination of a differential pressure measuring device connected so as to measure the difference between the pressure of said lubricant between the opposed faces of one of said bearing assemblies and the pressure of said lubricant between the opposed faces of the other said bearing assemblies, whereby when said rotating components are displaced in one direction by an end thrust loading one of said bearing assemblies and unloading the other, said comparison will indicate the pressure in the loaded assembly compared to an unloaded assembly and hence the end thrust on the loaded assembly, and a balancing means to adjust the thrust force on said bearing assemblies.

11. The combination of claim 10 wherein said balancing means is responsively connected to said differential pressure measuring means and said differential pressure measuring means contains means to automatically adjust said balancing means.

12. A rotating machine according to claim 10 wherein the lubricant between each of the opposed bearing assemblies forms part of a common lubricant body.

13. A rotating machine according to claim 10 wherein said bearing lubricant bodies are created by the relative rotation of said components.

* * * * *